United States Patent [19]
von Bonin

[11] Patent Number: 5,328,719
[45] Date of Patent: Jul. 12, 1994

[54] METHOD OF USING IMPROVED INTUMESCENCE CARRIERS FOR FIREPROOF GLASSES

[75] Inventor: Wulf von Bonin, Odenthal, Fed. Rep. of Germany

[73] Assignee: Bayer Aktiengesellschaft, Leverkusen, Fed. Rep. of Germany

[21] Appl. No.: 99,897

[22] Filed: Jul. 30, 1993

[30] Foreign Application Priority Data

Aug. 6, 1992 [DE] Fed. Rep. of Germany ....... 4226044

[51] Int. Cl.$^5$ .............................. C09K 21/02
[52] U.S. Cl. ................... 427/165; 106/18.13; 427/376.2; 427/384; 427/389.7; 427/393.3; 428/921
[58] Field of Search ............. 106/18.13; 427/165, 427/376.2, 384, 389.7, 393.3; 428/921; 252/4, 601, 606

[56] References Cited

U.S. PATENT DOCUMENTS

| | | | |
|---|---|---|---|
| 4,182,681 | 1/1980 | Gumbert | 252/8.1 |
| 4,288,491 | 9/1981 | Surzhenko et al. | 428/332 |
| 4,446,061 | 5/1984 | Joyce, III et al. | 106/18.13 |
| 4,539,045 | 9/1985 | Wagner | 106/18.13 |
| 5,151,225 | 9/1992 | Herndon et al. | 106/18.13 |
| 5,156,775 | 10/1992 | Blount | 252/609 |
| 5,182,049 | 1/1993 | von Bonin | 252/378 R |

FOREIGN PATENT DOCUMENTS

| | | |
|---|---|---|
| 0389768 | 10/1990 | European Pat. Off. . |
| 0468259 | 1/1992 | European Pat. Off. . |
| 0527401 | 2/1993 | European Pat. Off. . |
| 4023310 | 1/1992 | Fed. Rep. of Germany . |
| 50-86523 | 7/1975 | Japan ................ 106/18.13 |
| 50-86525 | 7/1975 | Japan ................ 106/18.13 |

OTHER PUBLICATIONS

Database WPI, Section Ch, Week 9209; Derwent Publications Ltd., London, GB; Class A 28, AN 92-069928 & JP-A-4015218 (Yokohama Rubber KK); Jan. 20, 1992; European Patent Office.

*Primary Examiner*—Anthony Green
*Attorney, Agent, or Firm*—Sprung Horn Kramer & Woods

[57] ABSTRACT

The present invention relates to the method of using intumescence carriers which are reaction products of aluminum compounds, phosphorus-containing acids, boron-containing acids and alkanolamines and can optionally contain up to 36 mol of water per mol of aluminum compound employed for fireproof glasses.

5 Claims, No Drawings

METHOD OF USING IMPROVED INTUMESCENCE CARRIERS FOR FIREPROOF GLASSES

The present invention relates to the method of using improved intumescence carriers which are based on aluminum phosphate amine salts and can be applied in aqueous systems or in solid form for fireproof glasses.

Intumescence carriers based on aluminum phosphate salts are already known and are described, for example, in German Offenlegungsschrift 4 023 310. Such intumescence carriers sometimes have excellent intumescence actions, but in many cases it is of advantage to have intumescence carriers with an intumescence action which is increased.

Intumescence is understood as meaning the ability of a material to foam, that is to say to intumesce, when exposed to flame or when heated to high temperatures.

The method of using intumescence carriers based on aluminium phosphate salts for fireproof glasses has now been found, which is characterised in that the intumescence carriers are reaction products of 1 mol of an aluminium compound with
2 to 5 mol of a phosphorus-containing acid,
2 to 9 mol of a boron-containing acid and
2 to 9 mol of an alkanolamine, which optionally contain up to 36 mol of water per mol of aluminium compound employed.

Possible aluminium compounds are, for example, those which give aluminium phosphates by reaction with a phosphoric acid, for example aluminium oxides, oxide hydrates, hydroxides and carbonates. Aluminum hydroxide Al(OH)$_3$, optionally containing water of crystallisation, is preferred.

Possible phosphorus-containing acids are, for example, ortho-, meta-, pyro- and polyphosphoric acids, as well as phosphonic and phosphinic acids. Orthophosphoric acid $H_3PO_4$ is preferred. Preferably, 2.5 to 3.5, particularly preferably 2.9 to 3.1 mol of phosphorus-containing acid are employed per 1 atom equivalent of aluminum in the aluminium compound.

Possible boron-containing acids are, for example, orthoboric acid and other boric acids or boron compounds which can be converted into orthoboric acid under the influence of water, for example boron oxides. Orthoboric acid $H_3BO_3$ is preferred. Preferably, 3 to 7, in particular 4 to 6 mol of boron-containing acid or a precursor thereof are employed per 1 atom equivalent of aluminium in the aluminium compound.

Possible alkanolamines are, for example, reaction products of ammonia or amines with alkylene oxides. In addition to ammonia, examples of amines which may be mentioned are hydrazine, hydroxylamine, optionally cyclic aliphatic, aromatic and heterocyclic amines and polyamines having up to 7N atoms and up to 20 C atoms, such as ethylenediamine, propylenediamine, piperazine and morpholine. Examples of alkylene oxides which may be mentioned are ethylene oxide, propylene oxide and mixtures thereof. Alkanolamines and polyalkanolamines containing polyether groups (such as diethanolamine, triethanolamine and, for example, mono- to tetraalkoxylated diamines, such as diethanolethylenediamine) are also possible. Monoethanolamine is preferred. Preferably, 3 to 7 mol of alkanolamine are employed per 1 atom equivalent of aluminium in the aluminium compound. The boron-containing acid and the alkanolamine are particularly preferably employed in the same molar amount.

The water content of intumescence carriers to be used according to the invention can vary within wide limits (0 to 36 mol per mol of aluminium compound employed), no distinction being made between water of solution, water of crystallisation and water liberated by condensation reactions. The water content is essentially influenced by the temperatures used during preparation and drying.

The intumescence carriers to be used according to the invention can be prepared by mixing the components in the presence of preferably as little water as possible, for example by kneading at 50° to 120° C., it being expedient to employ aluminium compounds which are as finely divided as possible.

It is often advantageous industrially to prepare, for example, a 50 to 80% strength by weight aqueous solution of the intumescence carriers according to the invention directly, for example by reacting the components in a corresponding amount of water in a stirred vessel at 25° to 110° C.

It has proved advantageous first to prepare, for example, a 65 to 75% strength by weight aluminium phosphate solution by reaction of the aluminium compounds with the phosphorus-containing acid in water, subsequently to add the alkanolamine to this, and finally to add the boron-containing acid, or to react the aluminium phosphate, in a 65 to 75% strength by weight solution, with a 50 to 75% strength by weight solution of a reaction product of a boron-containing acid and an alkanolamine. This reaction is exothermic. The intumescence carriers thus prepared can be present as a clear solution or as a dispersion in the aqueous medium. Where solutions are referred to here, the solvent is in general water.

The intumescence capacity of the intumescence carriers to be used according to the invention depends on the molar ratio of aluminium compound + phosphorus-containing acid on the one hand to boron-containing acid + alkanolamine on the other hand. An acid aluminium phosphate (for example Al-$(H_2PO_4)_3$) is formed formally from the aluminium compound and the phosphorus-containing acid, and a boric acid-alkanolamine complex (for example $H_3BO_3 \times H_2N-CH_2-OH$) is formed formally from the boron containing acid and alkanolamine. For example, at a molar ratio of Al(H$_2$PO$_4$)$_3$ to $H_3BO_3 \times H_2-CH_2-CH_2-OH$ or other corresponding aluminium phosphates to other corresponding boric acid-alkanolamine complexes of 1:1, the intumescence is lower than if this molar ratio, as is particularly preferred, is 1:3.5 to 1:6. If this molar ratio decreases further, for example below 1:7.5, the intumescence drops again.

This means that for given starting materials, the intumescence properties can be controlled largely as desired by the corresponding choice of the amounts of starting materials.

In the context of the present invention, a portion of the alkanolamines employed, if appropriate, can be replaced by ammonia, ethylenediamine or other volatile amines, but preferably not more than 50 mol % of the alkanolamines are replaced. The organic content in the intumescence carrier is reduced further by the use of ammonia.

Other preferred intumescence carriers to be used according to the invention are reaction products of one mol of aluminium hydroxide with 3 mol of orthophosphoric acid, 3 to 7 mol of monoethanolamine and 3 to 7 mol of orthoboric acid, such reaction products as a mixture with 20 to 70% by weight of water (based on the mixture) and
such reaction products which have been dried at up to 150° C., preferably between 10° to 120° C. (under normal pressure).

Intumescence carriers to be used according to the invention can provide protection against the passage of flames, heat and combustion gases to windows and laminated glass constructions.

Heating the intumescence carriers to be used according to the invention gives largely inorganic intumescence foams which in many cases are stable up to temperatures above 1200° C., are not subject to oxidative wear, in many cases are fine-pored and results in outstanding thermal insulating materials, foaming being associated with the generation of only small amounts of smoke gases.

Intumescence carriers to be used according to the invention, also in the form of their formulations in aqueous or other distribution media (by this there are also to be understood matrices of plastic, polymers and polymer dispersions) are excellent binders having an intumescent and fireproof character.

Intumescence carriers to be used according to the invention are suitable, in particular in the form of their aqueous solutions, which can optionally also contain gel-forming additives (for example high molecular weight and/or crosslinked polyacrylamides, poly(-meth)-acrylic acids and/or polyvinyl alcohol), for the preparation of fillings for laminated glass constructions, for example for use as fireproof windows.

The aqueous solutions of the intumescence carriers to be used according to the invention in general have pH values of between 4 and 8, in particular between 6 and 7. That is surprising, since their molar composition has considerable excess of acid equivalents over base equivalents. Because of their favourable pH, they are readily compatible with many types of glass and can therefore readily be combined with them.

Aqueous combinations of intumescence carriers to be used according to the invention with gel-forming agents such as can be used for fireproof glazing can comprise 10 to 98, preferably 50 to 90% by weight of intumescence carrier to be used according to the invention, based on the solid constituents of the gel. The combinations can comprise gel-forming and if appropriate other additives to make up to 100% by weight of solid constituents. The total solids content of such gels can be, for example, between 10 and 95, preferably between 45 to 70% by weight.

It is advantageous to employ intumescence carriers to be used according to the invention as a solid or aqueous solution without further additions or with small amounts of additives and auxiliaries, for example up to 10% by weight, preferably up to 5% by weight, for example for window areas.

A preferred use of intumescence carriers to be used according to the invention is the preparation of aqueous gels, by mixing with gel-forming additions and water, which are suitable as a filling or coating of laminated glass constructions for fireproofing purposes.

In the discovery of the intumescence carriers to be used according to the invention, it was surprising not only that aqueous solutions having pH values of between 6 and 7 are obtainable with relatively small molar amounts of alkanolamines, but also that clear and stable solutions can be obtained within the system of aluminium phosphate/boric acid with relatively small amounts of alkanolamines. It was furthermore surprising that in the aqueous gel system of $Al(H_2PO_4)_3$/polyacrylamide proved for window fillings, which tends to display clouding and phase separations after only a few hours at 80° C., stabilities of more than 120 hours at 80° C. are achieved, if, for example, the reaction product of 1 mol of boric acid with 1 mol of monoethanolamine is added in molar ratios of, for example, 1:3 to 1:7, preferably 1:4 to 1:6, and intumescence carriers to be used according to the invention are thus produced. It was also not to be expected that, for example, a complex of 1 mol of aluminium trisphosphate and 3 mol of the reaction product of 1 mol of boric acid and 1 mol of ethanolamine exhibits considerably better intumescene properties than the reaction product of 1 mol of aluminium trisphosphate with 3 mol of ethanolamine.

The invention is illustrated by way of example in the following text. The parts of percentages mentioned relate to the weight, unless stated otherwise.

EXAMPLES

General

To characterise the intumescence capacity, 1 g of the particular powdered intumescence carrier was introduced into a test-tube of 12 mm diameter. The test-tube was the placed in a heating cabinet preheated to 400° C., and was removed after 30 minutes. The height the resulting intumescence foam had ascended was then measured in cm and the measurement value thus obtained was stated directly as the intumescence value.

COMPARISON EXAMPLE

A clear solution of $Al(H_2PO_4)_3$ was prepared in 60% strength aqueous solution by dissolving 1 mol of Al(OH)$_3$ in concentrated $H_3PO_4$ (3 mol) at 100° C. This solution was reacted with 3 mol of monoethanolamine and the resulting clear solution (pH 6.1) was dried to constant weight at 80° C. The material thus obtained had an intumescence value of 1.8. The intumescence foam formed was coarsepored and not very homogeneous.

EXAMPLE 1

The procedure was as in the comparison example. However, before the drying operation, 3 mol of $H_3BO_3$ were also added and dissolved at 80° C. A solution with a pH of 6.8 was obtained and was now dried to constant weight at 80° C. The resulting material was easy to powder and had an intumescence value of 5.5. The intumescence foam formed was fine-pored and very homogeneous.

This example illustrates the considerably improved intumescence properties of intumescence carriers to be used according to the invention.

EXAMPLE 2

The procedure was as in Example 1, but instead of 3 mol of ethanolamine, a mixture of 2 mol of diisopropanolamine and 1 mol of ammonia was used. The intumescence value of the resulting material was 3.5. The intumescence foam was homogeneous and fine-pored.

EXAMPLE 3

The procedure was as in Example 1, but instead of monoethanolamine, 1 mol of triethanolamine mixed with 1 mol of diethanolamine and 1 mol of monoethanolamine was employed. The intumescence value of the resulting material was 3.1. The intumescence foam was relatively coarse-pored.

EXAMPLE 4

A 70% strength aqueous solution of $Al(H_2PO_4)_3$ and a 70% strength solution of the reaction product of 1 mol of $H_3BO_3$ and 1 mol of ethanolamine were each prepared separately. The two solutions were then combined at 60° C. and stirred until a clear solution had formed. Mixing of the solutions was carried out with various molar ratios of Al:B. Finally, the mixtures were in each case dried to constant weight at 80° C. and the intumescence value was determined.

| Molar ratio of Al:B | 1:2 | 1:2.5 | 1:3 | 1:3.5 | 1:4 | 1:4.5 | 1:5 | 1:6 |
|---|---|---|---|---|---|---|---|---|
| Intumescence value | 2.0 | 3.5 | 5.5 | 6.0 | 6.1 | 6.0 | 5.3 | 5.0 |

The intumescence values found show the possibility of being able to adjust the intumescence properties by the ratio of Al:B.

EXAMPLE 5

A material having an intumescence value of 3.5 was obtained by reaction of a 70% strength aqueous solution of the complex $H_3BO_3 \cdot H_2NC_2H_4OH$ with a 70% strength aqueous solution of (theoretical formula) $(HO)Al(H_2PO_4)_2$ in a molar ratio of 4:1 at 80° C. and evaporation at 80° C.

EXAMPLE 6

A 70% strength solution of $Al(H_2PO_4)_3$ in water (solution 1) and a 50% strength solution of $H_3BO_3 \cdot H_2NC_2H_4OH$ in water (solution 2) were prepared.

A 50% strength solution of acrylamide in water (gel-forming agent-solution 3) and a 25% strength aqueous ammonium persulphate solution (solution 4-initiator) were then prepared.

600 parts of solution 1 were mixed with 1400 parts of solution 2 under an $N_2$ atmosphere. A low-viscosity clear solution was formed in a slightly exothermic reaction. After cooling to 18° C., 240 parts of solution 3 were stirred in (under $N_2$), followed by 1 part of solution 4. A clear mixture was obtained and was immediately purified by filtration to a pressure filter ($N_2$) and then introduced into a float glass three-pane laminate, taking care to exclude air. The three-pane laminate then comprised three float glass panes each 3 mm thick and two intermediate spaces filled with the mixture, likewise each 3 mm thick. The pane laminate was sealed round the edges with silicone jointing compound. The mixture introduced into the pane laminate with exclusion of air polymerised at 15° C. within 20 hours to form a viscous gel, even without activation by supplying heat or irradiation. The pane laminate retained its clarity even after storage at 80° C. for 100 hours, and when exposed to flame, no flowing or melting of the gel occurred.

A pane laminate 50×50 cm in area filled in this way was exposed to flames in a small baking furnace by the standard temperature curve in accordance with DIN 4102. After 30 minutes, the average value of a 5-point measurement of the surface temperature by IR photometry was still less than 160° C. (on the surface of the pane laminate facing away from the fire). The laminate ensured that the chamber remained sealed for a period of over 90 minutes.

What is claimed is:

1. The method of fireproofing laminated glass constructions, which comprises filling or coating said laminated glass constructions with an intumescence carrier wherein said intumescence carrier is the reaction product of
   1. 1 mol of an aluminum compound selected from the group consisting of aluminum oxides, aluminum-oxide hydrates, aluminum hydroxides, and aluminum carbonates, with
   2. 2 to 5 mol of a phosphorous-containing acid selected from the group consisting of orthophosphoric acid, metaphosphoric acid, pyrophosphoric acid, polyphosphoric acid, phosphonic acid, and phosphinic acid,
   3. 2–9 mol of a boric acid, and
   4. 2 to 9 mol of an alkanolamine.

2. The method of claim 1, wherein said intumescence carrier additionally contains up to 36 mol of water per mol of said aluminum compound employed.

3. The method of claim 1, wherein the intumescence carrier is the reaction product of
   1 mol of aluminum hydroxide with
   3 mol of orthophosphoric acid,
   3 to 7 mol of orthoboric acid and
   3 to 7 mol of monoethanolamine.

4. The method of claim 1, wherein said reaction product is dried at a temperature of up to 150° C. under normal pressure.

5. The method of claim 1, wherein said intumescence carrier is in the form of an aqueous gel.

* * * * *